United States Patent [19]
Hata et al.

[11] Patent Number: 6,154,632
[45] Date of Patent: Nov. 28, 2000

[54] PICTURE DISTRIBUTION SERVICE SYSTEM

[75] Inventors: Emi Hata, Tokyo; Tetsuo Nishino; Osamu Isono, both of Kawasaki; Toshimasa Fukui, Yokohama; Tetsuo Tachibana, Kawasaki, all of Japan

[73] Assignee: Fujitsu Limited, Kawasaki, Japan

[21] Appl. No.: 08/650,657

[22] Filed: May 20, 1996

Related U.S. Application Data

[63] Continuation of application No. 08/380,139, Jan. 27, 1995, which is a continuation of application No. 07/671,229, Mar. 19, 1991, abandoned.

[30] Foreign Application Priority Data

| Mar. 20, 1990 | [JP] | Japan | 2-68146 |
| Sep. 4, 1990 | [JP] | Japan | 2-233691 |
| Oct. 19, 1990 | [JP] | Japan | 2-279151 |

[51] Int. Cl.$^7$ .................................................. H04H 1/02
[52] U.S. Cl. ........................ 455/3.1; 455/4.2; 455/5.1; 455/6.1; 348/7; 348/12; 348/13; 348/16
[58] Field of Search ................. 455/3.1, 4.1, 4.2, 455/5.1, 6.1, 6.2; 348/6, 7, 10, 12, 13, 15, 16, 17, 18

[56] References Cited

U.S. PATENT DOCUMENTS

| 4,769,833 | 9/1988 | Farleigh et al. | 455/4.2 |
| 4,994,909 | 2/1991 | Graves et al. | 45/5.1 |
| 5,093,718 | 3/1992 | Hoarty et al. | 358/86 |
| 5,200,989 | 4/1993 | Milone | 348/16 |
| 5,208,665 | 5/1993 | McCalley et al. | 348/12 |
| 5,371,534 | 12/1994 | Dagdeviren et al. | 348/17 X |
| 5,412,418 | 5/1995 | Nishimura et al. | 348/17 X |
| 5,887,243 | 3/1999 | Harvey et al. | 455/3.1 |

*Primary Examiner*—Fan Tsang
*Assistant Examiner*—Philip J. Sobutka
*Attorney, Agent, or Firm*—Arent Fox Kintner Plotkin & Kahn PLLC

[57] ABSTRACT

A picture distribution service system carries out a distribution control of picture information service in a broadband transit switching network having a hierarchical structure. The system comprises a plurality of transit switches for switching transit lines through which picture information is transmitted from a source and distributed by a center switch, a first trunk part provided for each of the transit switches for distributing the picture information from the center switch to the transit lines, a plurality of subscriber switches for switching subscriber lines through which the picture information from each of the transit lines is transmitted to a plurality of subscriber terminals, and a second trunk part provided for each of the subsriber switches for distributing the picture information from each of the transit switches to the subscriber lines.

16 Claims, 12 Drawing Sheets

- #1 PROTOCOL IDENTIFIER
- #2 CALL NUMBER
- #3 MESSAGE TYPE
- #4 CAPACITY
- #5 REASON
- #6 CHANNEL IDENTIFIER
- #7 INDICATION
- #8 KEYPAD FACILITY
- #9 RECEIVE NUMBER
- #9 LOWER LAYER MATCHING
- #11 UPPER LAYER MATCHING

1 PROTOCOL IDENTIFIER  #2 CALL NUMBER  #3 MESSAGE TYEP  #4 CAPACITY
5 REASON  #6 CHANNEL IDENTIFIER  #7 INDICATION  #8 KEYPAD FACILITY
9 RECEIVE NUMBER  #9 LOWER LAYER MATCHING  #11 UPPER LAYER MATCHING 6,154,632

PICTURE DISTRIBUTION SERVICE SYSTEM

This application is a continuation of application Ser. No. 08/380,139 filed Jan. 27, 1995, which in turn is a continuation of application Ser. No. 07/671,229, filed Mar. 19, 1991, now abandoned.

BACKGROUND OF THE INVENTION

The present invention relates generally to a picture distribution service system, and more particularly to a cable television picture distribution service system which allows many subscribers to receive various kinds of distributed picture services, such as cable television programs, by making efficient use of a limited number of transmission channels accommodated in the cable television picture distribution service system.

Recently, the Broadcast aspects of Integrated Services Digital Network (B-ISDN) have been developed as a broadband transit switching network for giving many subscribers a faster data transmission service and a finer picture transmission service. It is expected that the transmission speed used in the broadband transit switching netwrok will be around 150 Mbps, and the use of a transmission speed four times as fast as 150 Mbps, or 600 Mbps, is being studied in the development phase. This broadband transit switching network will enable a faster, greater capacity transmission of picture information services and cable television programs to many subscribers through the B-ISDN.

During recent years, the application of a cable television distribution system to the broadband transit switching network has been studied. In this cable television distribution system, an optical fiber cable as a transit line linking a central switch to a number of remote terminals and to a subscriber line linking each remote terminal to subscriber terminals has been used for achieving a faster, greater capacity data transmission in the broadband transit switching network. For example, a conventional broadband transit switching network system used for a telephone switching system is illustrated in FIG. 1. This conventional broadband transit switching network system generally has a central switch CO, a number of remote equipment units RE, and a number of subscriber terminals 4A, 4B, 4C, ... which may be, for example, visual telephone terminals. As shown in FIG. 1, a transit looped line L made of an optical fiber cable is capable of data transmission at a rate of 2.4 Gbps in a so-called time slot process and is used for linking the central switch CO to the plurality of remote equipment units RE. A number of subscriber lines "l" each made of an optical fiber cable are capable of data transmission at a rate of 600 Mbps and these lines are used for linking the remote equipment units RE to the subscriber terminals. The central switch CO is a station in which a switching is carried out. The remote equipment unit RE which comprises a concentrating part S1, a separating part S2, a signal processing unit SGU and a call processing unit CPU is provided for carrying out a concentration/separation of subscriber lines from the plurality of subscriber terminals. A concentrated or separated line from the remote equipment units RE is connected to the transit looped line L. The central switch CO comprises a switch SW and a call processing unit (CPU).

In the conventional broadband transit switching system employing an optical fiber cable as shown in FIG. 1, there still exists some unused data transmission capacity even when a number of visual telephone terminals are used as the subscriber terminals in the broadband transit switching system. Thus, there is a demand to make efficient use of this broadband transit switching system. And, there is a problem in that, when the same picture information source is called from too many subscriber terminals through the central switch at the same time, network congestion takes place due to the limited number of transit lines in the broadband transit switching system. In such a case, it is impossible for the conventional system to supply the picture information to all the subscribers who have called the picture information and therefore some of them experience difficulties in receiving the picture information normally distributed from the center switch.

SUMMARY OF THE INVENTION

It is a general object of the present invention to provide a novel and useful cable television picture distribution service system in which the above described problems or disadvantages are eliminated.

Another and more specific object of the present invention is to provide a picture distribution service system which can supply various picture information services to many subscribers to suit the various needs of the users by making efficient use of the existing transmission channels.

This object of the present invention is achieved by a picture distribution service system which carries out a distribution control of a cable television picture service in a broadband transit switching network having a hierarchical structure, the picture distribution service system comprising a plurality of transit switches for switching transit lines through which picture information is sent from a source and distributed by a center switch, a first trunk part provided for each of the transit switches for distributing the picture information from the center switch to the transit lines, a plurality of subscriber switches for switching subscriber lines through which the picture information from each the transit switch is transmitted to a plurality of subscriber terminals, and a second trunk part provided for each of the subscriber switches for distributing the picture information from each the transit switch to the subscriber lines. According to the present invention, the picture information transmitted from the center switch via a transit line is distributed by a transit switch or subscriber switch to a transit line or to a subscriber switch, thereby preventing congestion of transit lines. Also, in the center switch accommodated in the picture information service center, the picture information distributed by the center switch can be transmitted to a transit switch through a transit line, thereby eliminating the inconvenience to the users due to the occurrence of the congestion of transit lines.

The above-mentioned object of the present invention is also achieved by a picture distribution service system which distributes a cable television service from a source to a plurality of subscriber terminals in a broadband transit network and supplies a picture processing service to the plurality of subscriber terminals for processing picture information from the source, the picture distribution service system comprising a transit switch which connects the plurality of subscriber terminals to a transit line for transmitting the picture information from the source, a distribution switch which distributes the picture information from the source to the plurality of subscriber terminals, the distribution switch being provided for the transit switch for carrying out a transit line connection and a picture signal conversion, and a plurality of function modules which link the transit switch to the distribution switch for carrying out a picture processing function by which supplied picture information from the source is recorded, replayed or viewed, each the function module having a switch, a picture memory part and a control part, the switch of each of the function modules being operated by the control part in accordance with a control from a call control part connected to the picture distribution service system when a call control signal is transmitted from one of the subscriber terminals to the call control part, so as to make selectively a direct connection of the switch from the subscriber terminal to the source or an indirect connection thereof from the subscriber terminal through the picture storage part to the source. According to the present invention, it is possible for cable television subscribers to use an enhanced picture processing function, such as picture recording, playback and viewing, while viewing a cable television program, owing to the picture memory part provided in each function module.

The above-mentioned object of the present invention is further achieved by a picture distribution service system which carries out a distribution control of a cable television program from a source to a subscriber house in a broadband transit network, the picture distribution service system comprising a plurality of terminals accommodated in the subscriber house, each the terminal making a prescribed request for program distribution, channel disconnection or program switching, a concentration part which carries out a line concentration of subscriber lines linking the plurality of terminals to the concentration part by a remote control through the broadband transit network, and a distribution control part for carrying out a distribution of a cable television program to a terminal among the plurality of terminals by means of a channel already in use when a request for program distribution concerning a specific program is made from the terminal and it is checked that the specific program is already distributed by means of the channel to another terminal in the subscriber house which accommodates the terminal, and for carrying out a distribution of the specific program through a new idle channel to the terminal when the request is made from the terminal and it is checked that the specific program is not distributed to another terminal in the subscriber house by means of the channel. According to the present invention, it is possible to assign the same cable television program to a single channel when that program is distributed in common to a plurality of terminal equipment units accommodated in the same subscriber house, thereby enabling an efficient program distribution to a plurality of terminal equipment units the number of which is greater than the maximum number of channels for cable television distribution purpose. Thus, by using a limited number of the channels accommodated in the same subscriber house, the efficiency of the picture distribution service system is remarkably increased.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

First, a description will be given of a first preferred embodiment of a picture distribution service system according to the present invention, with reference to FIG. 2.

Figure 1:
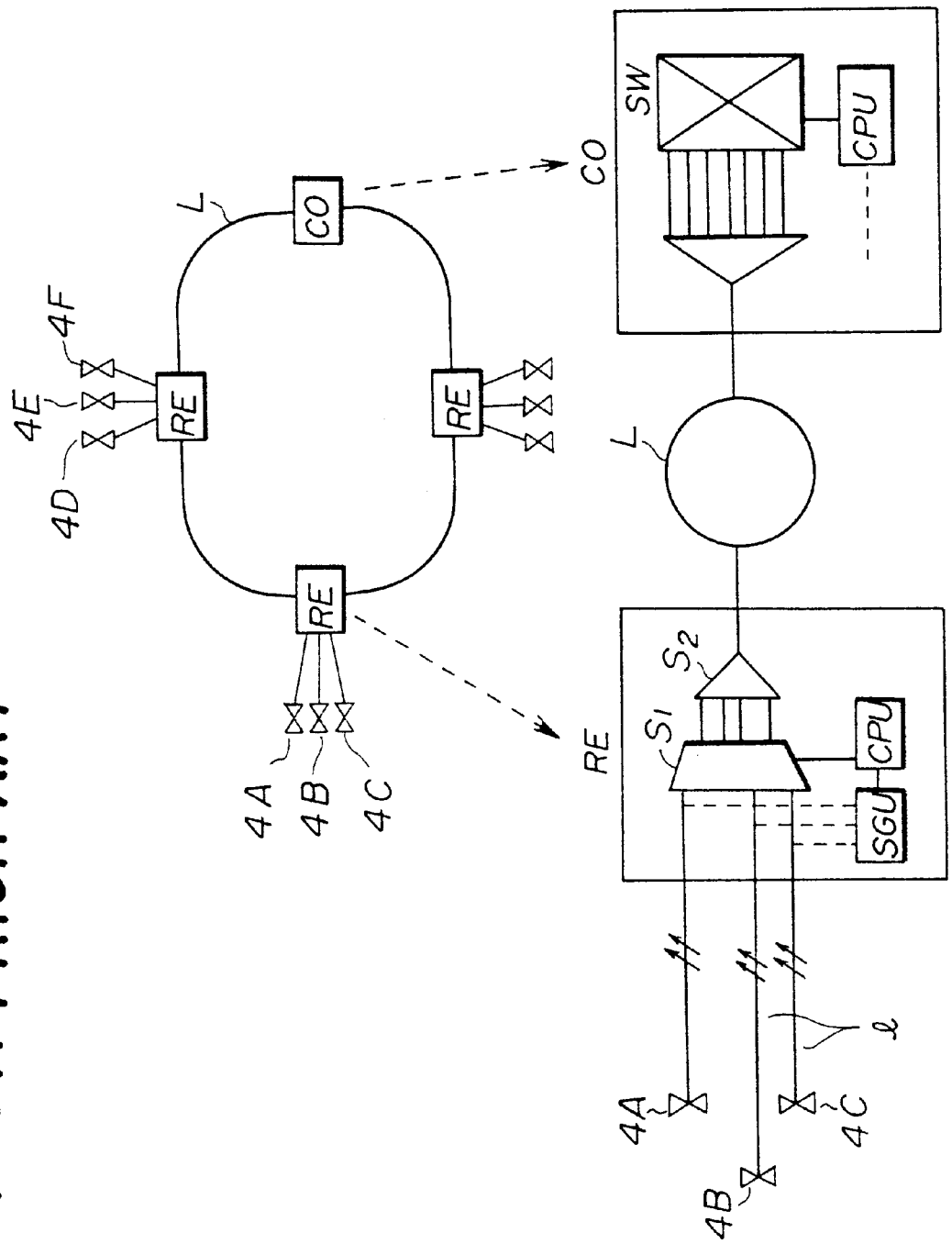
FIG. 1 is a diagram illustrating a conventional broadband switching system which is applied to a telephone switching system.
Figure 2:
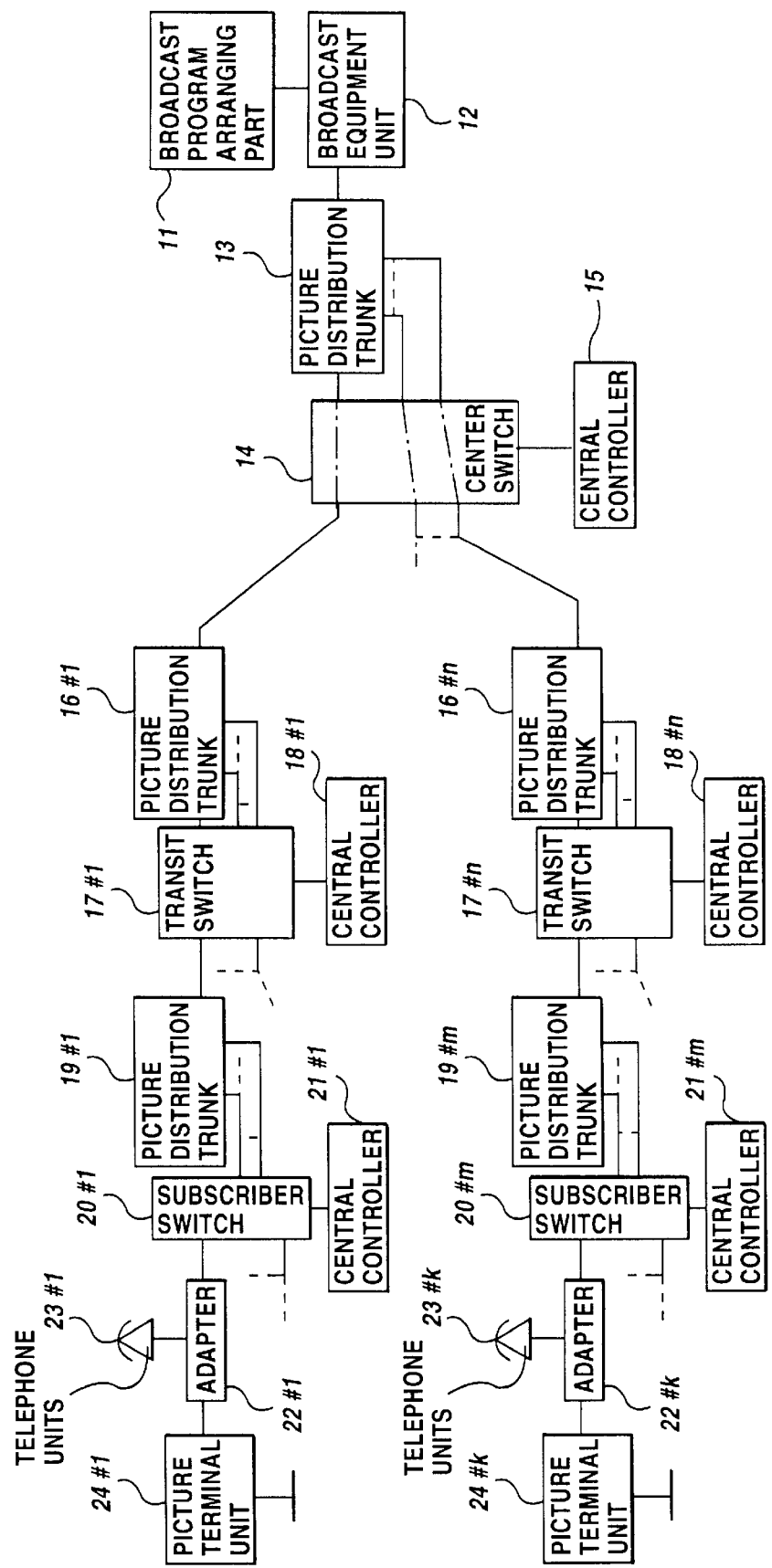
FIG. 2 is a diagram illustrating a first embodiment of a picture distribution service system according to the present invention.

FIG. 2 is a diagram for explaining the first embodiment of the present invention. This picture distribution service system shown in FIG. 2 generally has a broadcast program arranging part 11, a broadcast equipment unit 12, a picture distribution trunk 13, a center switch 14, a central controller 15, a number of picture distribution trunks 16#1 through 16#n, a number of transit switches 17#1 through 17#n, a number of central controllers 18#1 through 18#n, a number of picture distribution trunks 19#1 through 19#m, a number of subscriber switches 20#1 through 20#m, a number of central controllers 21#1 through 21#n, a number of adapters 22#1 through 22#k, a number of telephone units 23#1 through 23#k, and a number of picture terminal units 24#1 through 24#k. As shown in FIG. 2, this picture distribution service system is constructed as a broadband switching system having a hierarchical structure, and this hierarchical structure is built such that the center switch 14 is equivalent to a master station or central station, the transit switches 17#1 through 17#n is equivalent to a central station or concentrator station, and the structure includes the subscriber switches 20#1 through 20#m.

The above described picture distribution trunks 13, 16#1 to 16#n and 19#1 to 19#m are each provided to distribute picture information supplied from the broadcast equipment unit 12 over a plurality of output terminals leading to the switches 14, 17#1 to 17#n and 20#1 to 20#m. For example, one picture information among those distributed by the picture distribution trunk 19#1 is sent respectively to a number of subscribers which are accommodated in the subscriber switch 20#1. One picture information item among those distributed by the picture distribution trunk 16#1 is sent respectively to a number of transit lines linking the transit switch 17#1 to the subscriber switch 20#1. And, one picture information item among those distributed by the picture distribution trunk 13 from picture information supplied from the broadcast equipment unit 12 is sent respectively to a number of transit lines linking the center switch 14 to the transit switch 17#1. Another picture information item distributed by the picture distribution trunk 13 is sent respectively to a number of transit lines linking the center switch 14 to any of the transit switches 17#2 to 17#n through paths as indicated by a phantom line in FIG. 2.

In the picture distribution described above, the central controllers 15, 18#1 to 18#n and 21#1 to 21#m can check as to whether the picture distribution trunks 13, 16#1 to 16#n and 19#1 to 19#m are already connected or captured due to a call being made to one picture information service source including the broadcast equipment unit 12. Therefore, when a subsequent call is made to the same picture information service source, the control by the center controllers 15, 18#1 to 18#n and 21#1 to 21#m is made so as to send a picture information item distributed by such a trunk which is already connected due to the preceding call, without searching another idle transit line from the trunk.

Figure 3:
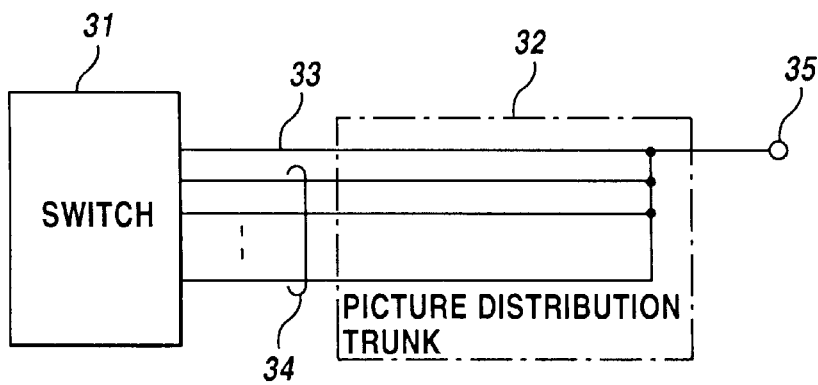
FIG. 3 is a diagram illustrating an example of the trunk according to the present invention.

FIG. 3 illustrates an example of the picture distribution trunk according to the present invention as described above. In FIG. 3, there are provided a switch 31 and a picture distribution trunk 32. As illustrated in FIG. 3, the picture distribution trunk 32 has a main terminal 33, a number of sub terminals 34 and an input terminal 35. A picture signal applied to the input terminal 35 is distributed to the output terminals 33 and 34, and each picture signal distributed is supplied to the switch 31 so that the picture information is sent from the switch 31 to different paths or subscribers via transit lines.

Figure 4:
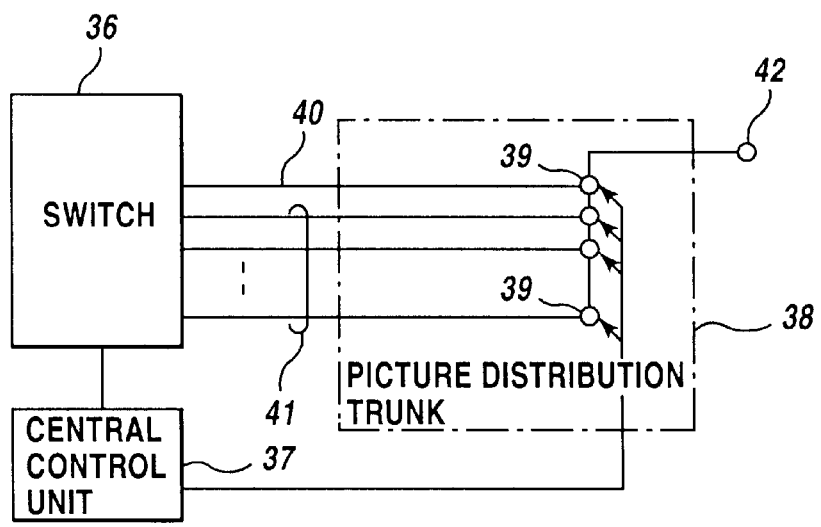
FIG. 4 is a diagram illustrating a modified example of the trunk according to the present invention.

FIG. 4 illustrates another example of the picture distribution trunk according to the present invention. In FIG. 4, there are provided a switch 36, a central control unit 37 and a picture distribution trunk 38. This picture distribution trunk 38 includes a number of gate switches 39, a main terminal 40, a plurality of sub terminals 41 and an input terminal 42. Each switching operation of the gate switches 39 is controlled by a control signal which is formed on the basis of a switching control data from the central controller 37. The switch 36 selects the picture distribution trunk 38 which was in an idle state, or not in a busy state, when a first call was made to the picture information service source, and the main terminal 40 of the selected picture distribution trunk 38 is connected. The gate switch 39 of the main terminal 40 is turned ON by the control of the central controller 37 so as to send the picture information item from the main terminal 40 to a transit line or a subscriber via the switch 36. When a second call is made to the same picture information service source, a second gate switch 39 of the picture distribution trunk 38 leading to one of the sub terminals 41 is turned ON, because the picture distribution trunk 38 is already connected. And, the picture information item from the input terminal 42 is distributed from that sub terminal 41 to a transit line or a subscriber via the switch 36. In other words, one sub terminal 41 may be selected from among the plurality of sub terminals 41 so as to distribute the picture information item from the input terminal 42 when the picture distribution trunk 38 is already connected and the subsequent calls are made to the same picture information service source.

Figure 5:
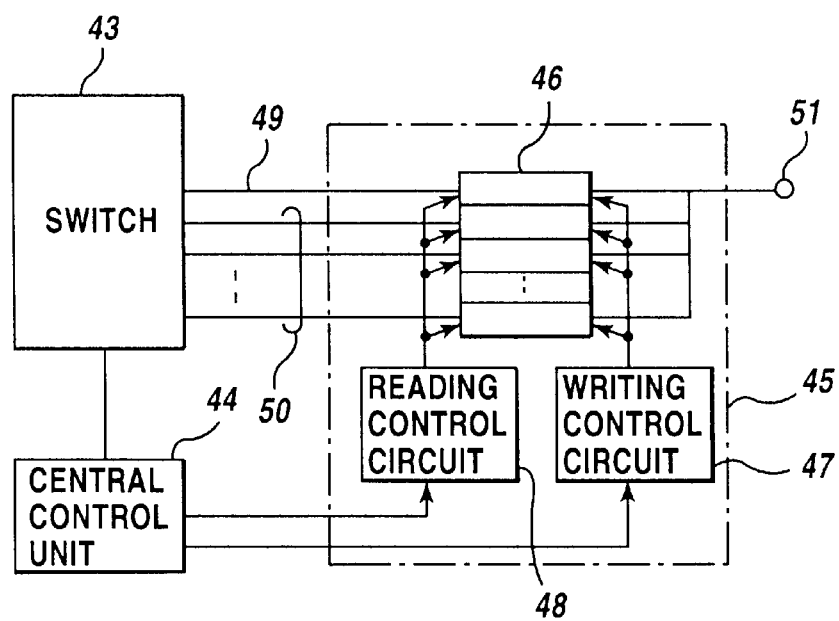
FIG. 5 is a diagram illustrating another modified example of the trunk.

FIG. 5 shows another example of the picture distribution trunk according to the present invention in which an input picture signal is distributed by means of a memory device. In FIG. 5, there are provided a switch 43, a central controller 44 and a picture distribution trunk 45. This picture distribution trunk 45 includes a memory 46, a writing control circuit 47 and a reading control circuit 48. The picture distribution trunk 45 further includes a main terminal 49, a plurality of sub terminals 50 and an input terminal 51.

The memory 46 is divided into several different regions which are controlled by the writing control circuit 47 and the reading control circuit 48 on the basis of a control signal sent from the central controller 44. An input picture information item from the input terminal 51 is recorded and stored in given regions or all the regions of the memory 46 by the control of the writing control circuit 47. In a case where such a control is made to store the input picture information item in all the regions of the memory 46, the writing control circuit 47 may be constructed to have a simple structure. And, by the control of the reading control circuit 48, the picture information item is read out from a region of the memory 46 corresponding to the output terminal to which picture information is to be distributed. Similar to the above case, the picture distribution trunk 45 is connected or captured when a first call is made to the picture information service source, and the main terminal 49 of the picture distribution trunk 45 is connected so that a reading of picture information item from the memory 46 is controlled by the reading control circuit 48 so as to distribute the picture information item to the main terminal 49. When a subsequent call is made to the same picture information service source, a writing of the picture information item to the memory 46 and a reading thereof from the memory 46 are controlled so as to supply the picture information item to the sub terminals 50 of the picture distribution trunk 45, as in the case described above.

Figure 6:
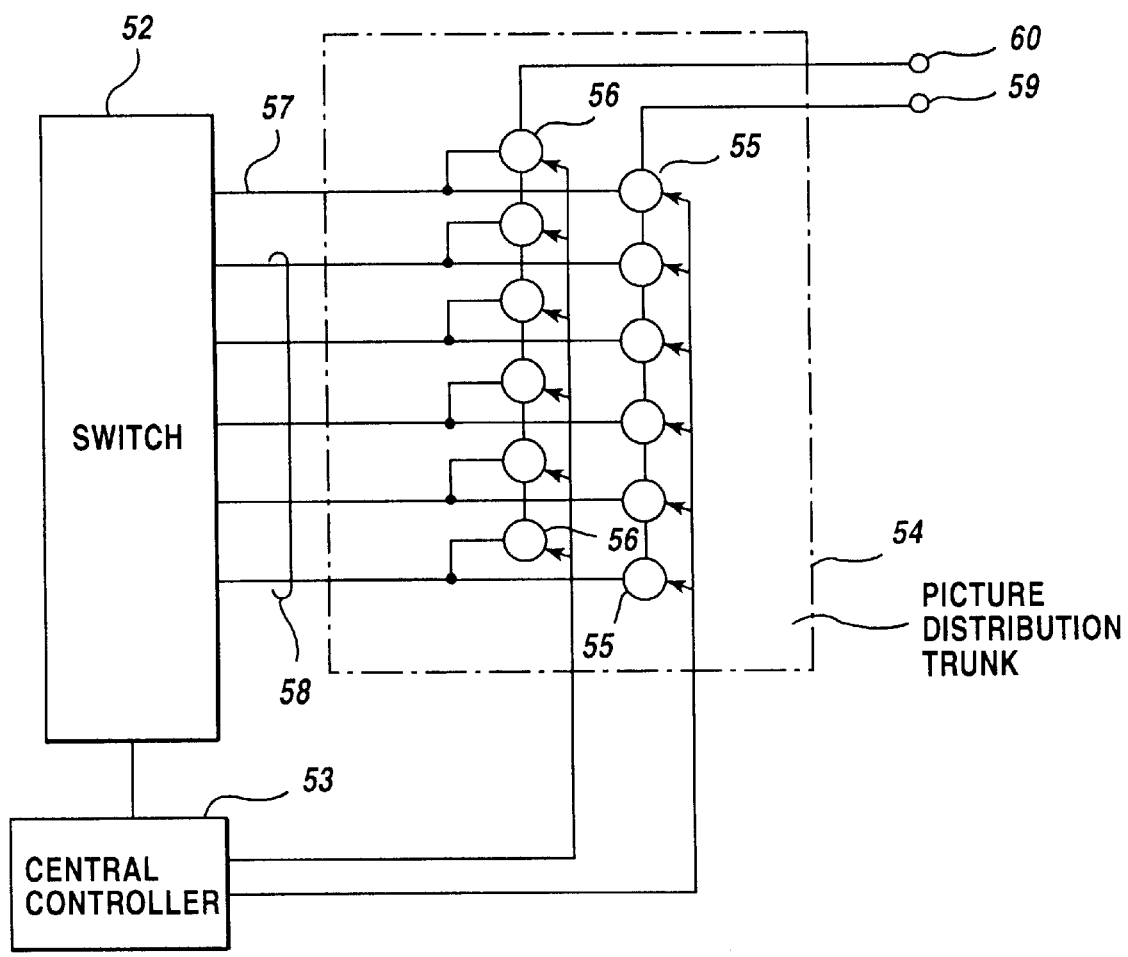
FIG. 6 is a diagram illustrating still another modified example of the trunk.

In the above described picture distribution trunks 32, 38 and 45, only a single kind of picture information is distributed to the switch. However, it is possible for the picture distribution trunk of the present invention to distribute two or more kinds of input picture information and supply them to the switch. FIG. 6 illustrates a further example of the picture distribution trunk according to the present invention. In FIG. 6, there are provided a switch 52, a central controller 53 and a picture distribution trunk 54 having two input terminals 59, 60. This picture distribution trunk 54 includes two sets of gate switches 55, 56 corresponding to the two input terminals 59, 60. By a control signal from the central controller 53, the two sets of gate switches 55, 56 are selectively controlled so that the picture distribution trunk 54 can distribute two different kinds of picture information from the input terminals 59, 60 to the switch 52 through the main terminal 57 and the sub terminals 58. Also, it is possible to provide the picture distribution trunk of the invention with a memory having two or more sets of regions in accordance with two or more kinds of input picture information supplied from a number of input terminals, so that such several kinds of input picture information are selectively distributed to the switch 52.

In the above described first embodiment, the picture distribution trunks are provided for several switches including the center switch, the transit switch and the subscriber switch in the broadband transit switching network having a hierarchical structure for distribution of picture information from the information source to the subscriber terminals. It is possible to prevent network congestion with these picture distribution trunks, when many subscribers simultaneously call the same information source. For this reason, the first embodiment of the present invention has an advantageous feature in that it is possible to prevent congestion of the center switch accommodated in the picture service center.

And, in the first embodiment of the picture distribution service system, when a first call is made to the service center, the channel for distributing a picture information service is connected to the main terminal of the picture distribution trunk. And, when a second call is made to the service center, the channel is connected to one sub terminal of the picture distribution trunk. This eliminates the need to capture transit lines when several calls are made to the same service center, and thus simplification of the switching processing is made possible.

Next, a description will be given of a second embodiment of a picture distribution service system, with reference to FIG. 7. As described above, with the recent development of the broadband transit switching network, a new picture information service in which conventional cable television picture information is distributed as a cable system telecommunication service using the broadband transit switching network is being considered. In the current broadcast service, several functions for picture processing of television program information are available to ordinary subscribers, and the subscribers can make use of the several functions by a combination of a television set and a video tape recorder, the several functions including picture recording, playback and viewing in several modes such as a slow mode, a fast feed mode and a stop mode. However, in the cable television system, the users must have a videotape recorder as well as a cable television terminal to make use of the above picture processing functions, which increases the cost of the equipment for the users. And, it is difficult for the subscribers to perform the added picture processing functions on their cable television terminals in real time as only a single monitor screen is available for use by the subscribers. Therefore, the second embodiment of the present invention is directed to the provision of a picture distribution service system which can supply added picture processing functions of cable television service to the subscribers without the need of a video tape recorder.

Figure 7:
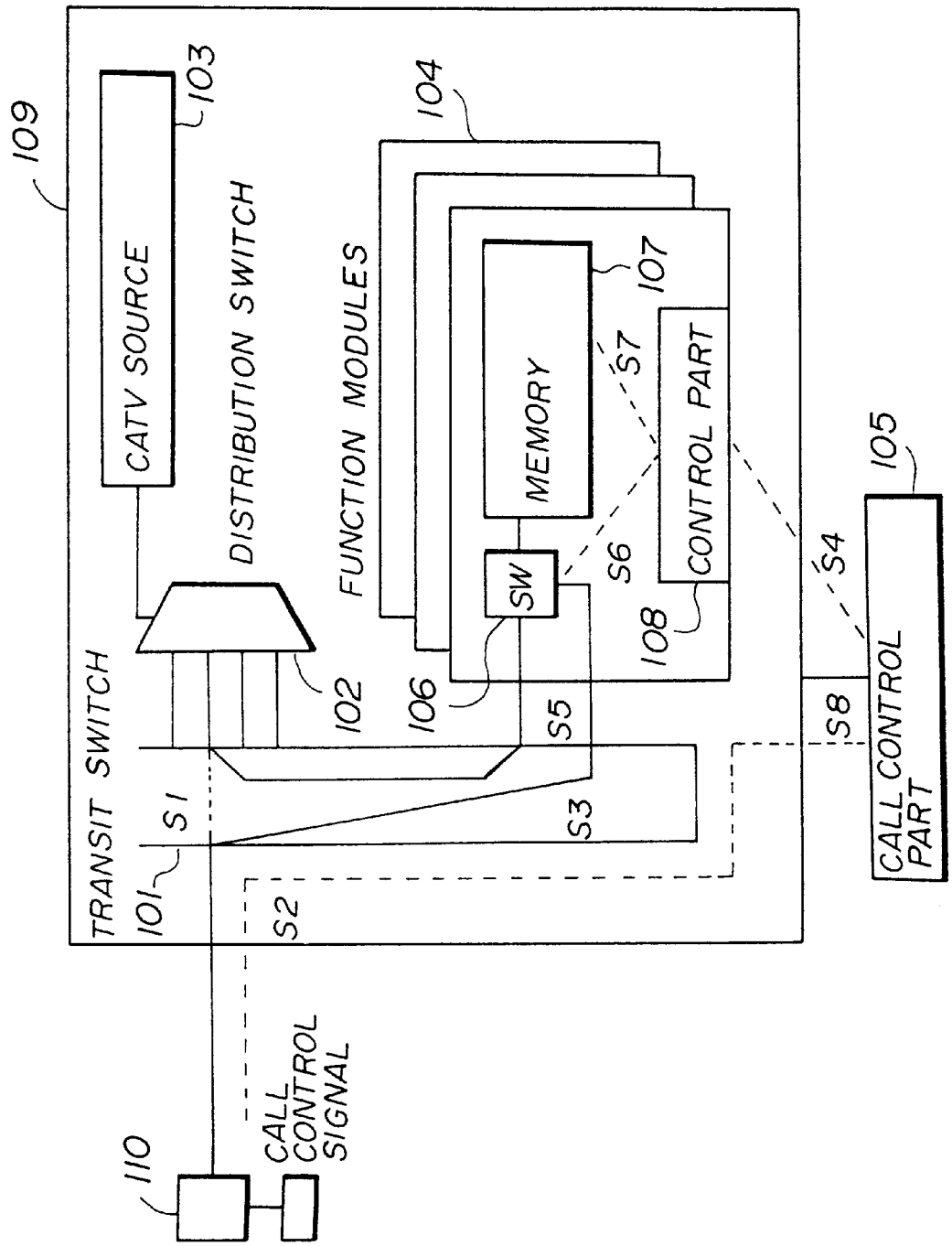
FIG. 7 is a diagram for explaining a second embodiment of a picture distribution service system according to the present invention.

In FIG. 7, there are illustrated a transit switch 101, a distribution switch 102, a cable television source 103, a plurality of function modules 104, a call control part 105, a cable television distribution switching system 109, and a subscriber terminal 110. It should be noted that this second embodiment of the present invention shown in FIG. 7 is applied to the picture distribution trunks 19#1 through 19#m, the subscriber switches 20#1 through 20#m and the central controllers 21#1 through 21#m in the broadband transit switching network system as shown in FIG. 2, but the present invention is not limited to the broadband transit switching network system shown in FIG. 2. This cable television distribution switching system 109 generally has the transit switch 101, the distribution switch 102 and the plurality of function modules 104, each function module 104 having a switch 106, a picture storage part 107 and a control part 108. Together with the transit switch 101, the distribution switch 102 is provided within the cable television distribution switching system 109 as a connection/conversion unit for distributing a picture information service from the cable television source 103 to the subscriber terminal 110. Together with the connection and conversion unit including the transit switch 101 and the distribution switch 102, the plurality of function modules 104 are provided as a common unit for enabling picture recording, playback and viewing of the picture information from the cable television source 103 to be used by a plurality of subscriber terminals. Each of the function modules 104 includes the switch 106 and the control part 108 for allowing the switch 106 to make a selective connection of the subscriber terminal 110 to the cable television source 103. This selective connection is made for either a direct connection to the cable television source or an indirect connection via the picture storage part 107 of the function module 104 to the cable television source. The control part 108 of the function module 104 controls a switching operation of the switch 106 so as to make the selective connection described above for a distribution of picture information service from the cable television source. The operation of the control part 108 is controlled in accordance with a control signal sent from the subscriber terminal 110 by the call control part 105 which is connected to the cable television distribution switching system 109. And, it is possible for the subscriber terminal 110 to make a designation of the selective connection, that is, the user at the subscriber terminal can make a designation as to whether the direct connection or the indirect connection is needed, by depressing a subscriber terminal button.

Figure 8:
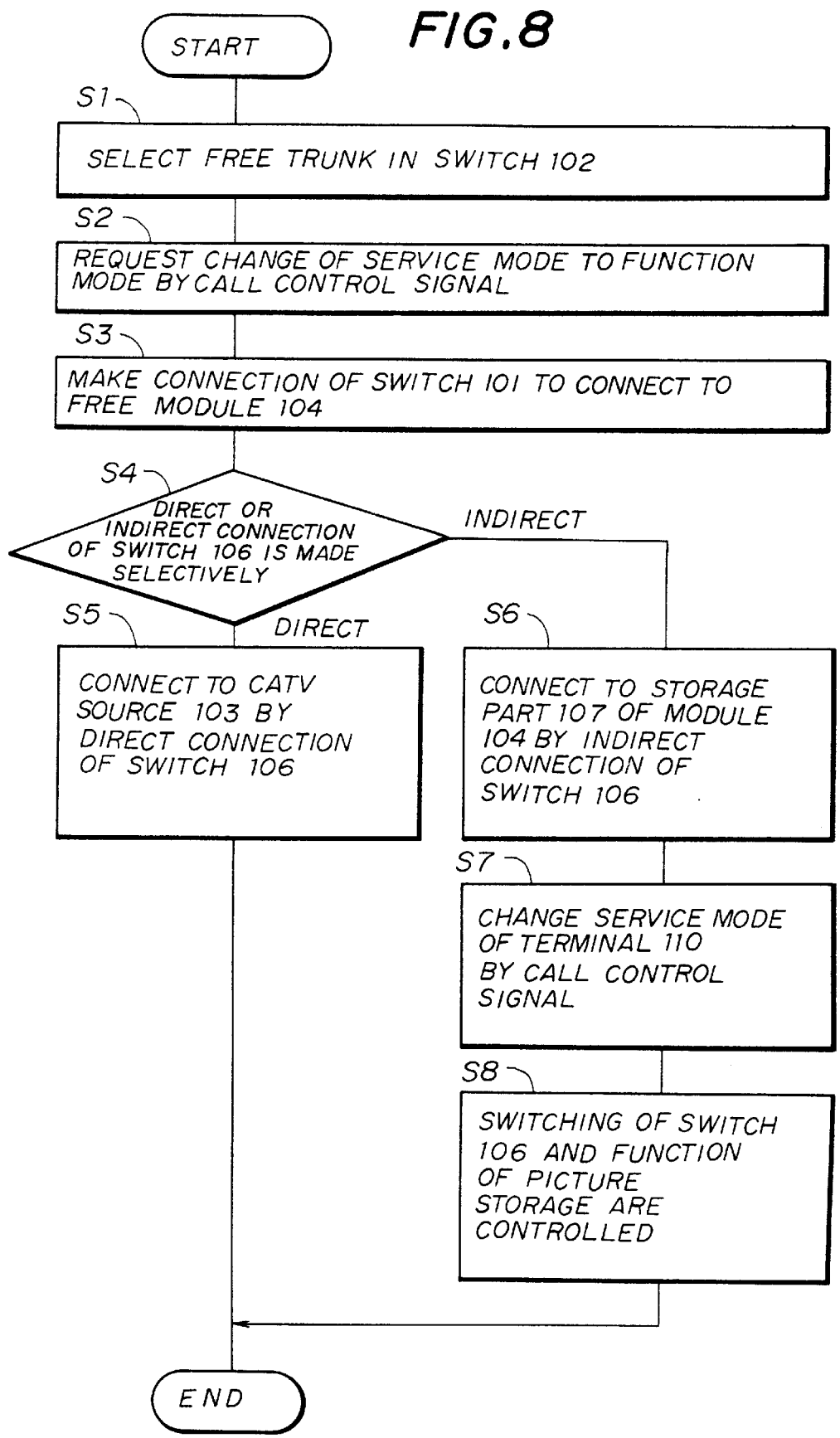
FIG. 8 is a flow chart for explaining the operation of the picture distribution service system shown in FIG. 7.

FIG. 8 is a flow chart for explaining the control operation of this picture distribution service system shown in FIG. 7 when an enhanced cable television service from the picture distribution service system is received by the subscriber terminal 110.

A step S1 selects an idle trunk in the distribution switch 102 through connection and conversion of the transit switch 101 to which a picture information service is supplied from the cable television source 103. A step S2 makes a request to cahnge the service mode of the cable television system from a normal mode in which a normal cable television distribution service is supplied to a function mode in which the enhanced cable television service is supplied. To receive the enhanced cable television service, the user depresses a button of the subscriber terminal 110 and a designation data is added to a call control signal being transmitted to the call control part 105 through the distribution switching system 109.

As the call control part 105 receives the request from the subscriber terminal 110, a step S3 makes an internal connection of the transit switch 101 so as to connect the subscriber terminal 110 to an idle function module among the plurality of the function modules 104. The call control part 105 receives the call control signal indicating whether a direct connection of the switch 106 to the cable television source 103 or an indirect connection thereof is designated. The call control part 105 controls the control part 108 of the function module 104 so as to make the above selective connection of the switch 106 in accordance with the call control signal received from the subscriber terminal 110. A step S4 enables the control part 108 of the function module 104 to make such a selective connection of the switch 106 depending on whether the direct connection of the switch 106 or the indirect connection thereof is designated by the received call control signal.

When the direct connection of the switch 106 is designated by the call control signal, the subscriber terminal 110 is connected directly to the cable television source 103. A step S5 makes the direct connection of the switch 106, this direct connection of the switch 106 allowing a connection of the subscriber terminal 110 from the transit switch 101 to the distribution switch 102 via the switch 106 of the function module 104 only. Therefore, the picture information from the cable television source 103 is supplied directly to the subscriber terminal 110 through the distribution switch 102 and the transit switch 101. On the other hand, when the indirect connection of the switch 106 is designated by the call control signal, the subscriber terminal 110 is connected to the picture storage part 107 of the function module 104. A step S6 makes the indirect connection of the switch 106, and this indirect connection of the switch 106 allows a connection of the subscriber terminal 110 from the transit switch 101 to the picture storage part 107 of the function module 104, and the picture storage part 107 is connected to the cable television source 103 through the distribution switch 102. Therefore, by this indirect connection, the user can instruct a change of a service mode in which the picture information is supplied from the cable television source 103 to the screen of the subscriber terminal 110.

A step S7 changes the service mode in which the picture information from the cable television source 103 is supplied to a screen of the subscriber terminal 110, in accordance with the needs of the user at the subscriber terminal 110. This service mode includes, for example, a SLOW mode, a FAST FEED mode and a STOP mode. When the user desires a service mode change and inputs a prescribed keystroke of instructions by depressing a button of the subscriber terminal 110, a call control signal including a service mode change data is transmitted from the subscriber terminal 110 to the call control part 105 so that the picture storage part 107 of the function module is notified of the service mode change. And, a step S8 makes the call control part 105 perform a switching action of the switch 106 of the function module so that a desired function provided with the picture storage part 107 is selected in accordance with the instructions indicated by the call control signal sent from the subscriber terminal 110.

Figure 9:
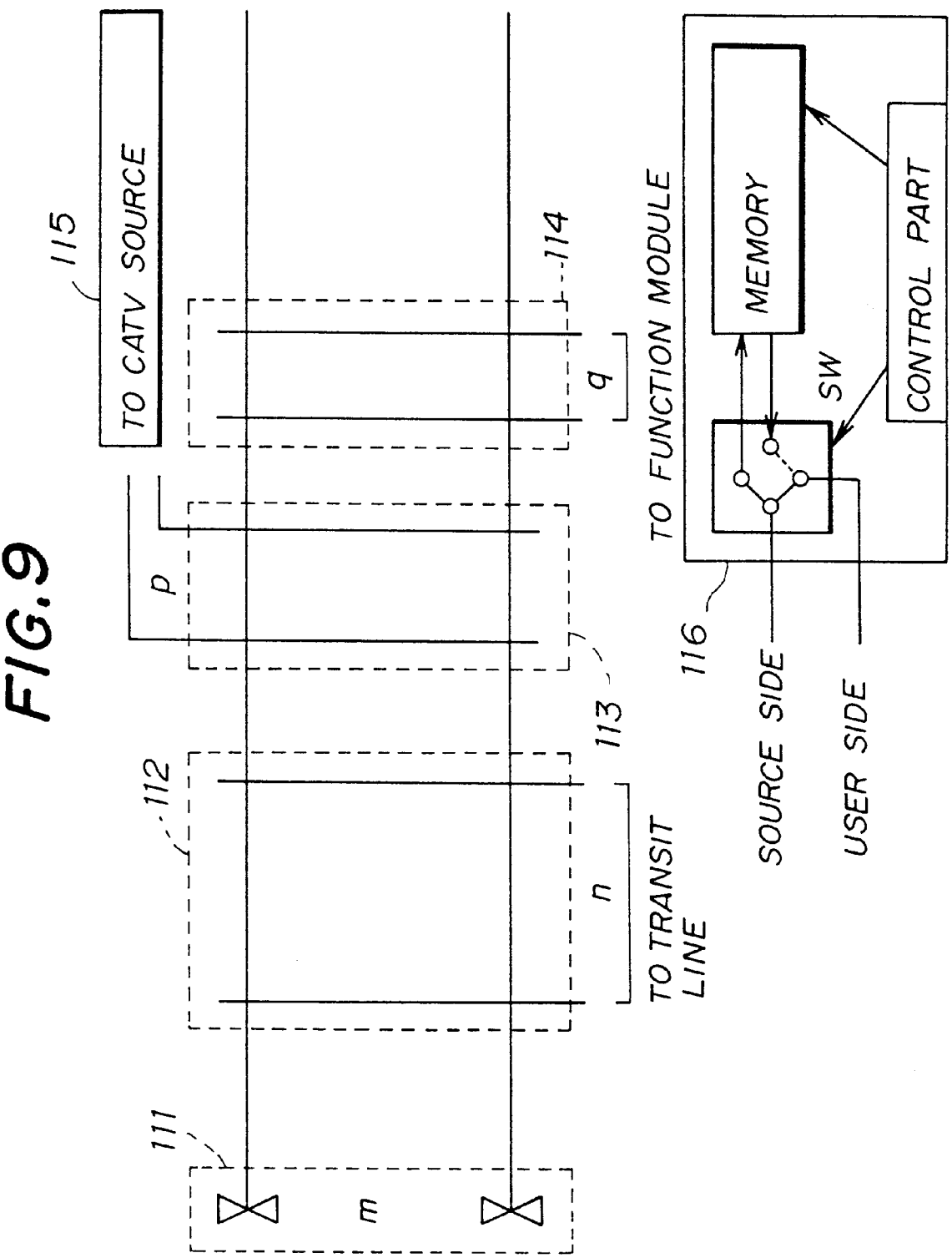
FIG. 9 is a diagram illustrating an example of the picture distribution service system which is applied to a broadband transit network.

FIG. 9 illustrates an example of the picture distribution service system as shown in FIG. 7 and 8 which is applied to the broadband transit switching network as shown in FIG. 2. In FIG. 9, there are illustrated a number of subscriber terminals 111, a transit switch 112 having a number of transit lines, a distribution switch 113 having a number of connecting lines, a module matrix 114, a number of cable television sources 115 which can be connected to the distribution switch 113, and a number of function modules 116 which can be accommodated in the module matrix. 114. One subscriber terminal 111 is linked to another subscriber terminal or a transit line by the transit switch 112, and is selectively connected to a certain cable television source 115 by the distribution switch 113. And, when the user makes a manual or keystroke operation on the subscriber terminal 111, the subscriber terminal 111 is connected to an idle function module selected from among a plurality of function modules 116 by the control of the module matrix 114 in accordance with the manual operation performed by the user.

It will now be assumed that the number of the subscriber terminals 111, the number of the transit lines in the transit switch 112, the number of the cable television sources 115 connected and the number of the function modules connected are indicated by "m", "n", "p" and "q", respectively, as shown in FIG. 9. If the number "m" of the subscriber terminals 111 is 1000, the cable television service is received by 500 subscribers, and if the number "n" of the transit lines in the transit switch 112 is 100, the picture distribution service system according to the present invention can be installed with a hundred of the cable television sources 115 (p=100) and fifty of the function modules 116 (q=50). Each cable television source 115 which is connected to the distribution switch 113 can accommodate up to a hundred channels. Therefore, the user at the subscriber terminal 111 can freely designate the cable television source 115 and the function module 116 according to need, and can select a desired channel of the cable television source 115 to receive the picture information service. And, the user can make use of the picture processing methods which are provided by the function module 116 according to the present invention even when the user has no video tape recorder unit.

When a direct connection of the switch of the function module 116 is made, a source side line and a user side line as well as the source side line and a memory side line from the memory part of the function module 116 are connected within the switch as indicated by a solid line in FIG. 9. And, when an indirect connection of the switch is made, the source side line and the user side line as well as the source side line and the memory side line are disconnected, and the user side line and the memory side line are connected within the switch as indicated by a dotted line in FIG. 9. In addition, the current picture information currently supplied from the cable television source is invariably inputted to the memory in the function module 116 in a cyclic manner every ten seconds so that the current picture information is overwritten to the memory in the function module 116 at all times. According to the present invention, it is possible for a cable television subscriber to carry out a picture processing method with the picture storage part of the function module while viewing a cable television program.

Next, a description will be given of a third embodiment of a picture distribution service system, with reference to FIG. 10. This third embodiment is directed to a picture distribution service system which is applied to a number of network terminations (NT) in the broadband transit switching network in which a cable television program service distribution capability is incorporated, and a plurality of terminal equipment units (TE) and a plurality of terminal adapters (TA) are connected to each NT. In a prior cable television program distribution system, the number of channels which are provided for picture distribution to the subscribers is limited, and the number of terminal equipment units (TE) which can be connected to the channels cannot exceed the maximum number of the channels. For this reason, there is a possibility that, in a certain case, all the channels provided would be used for distributing only one cable television program to the subscribers, although several kinds of programs are being supplied from the cable television source. This third embodiment of the present invention relates to a picture distribution service system which enables a distribution of the same program from the cable television source to a plurality of terminal equipment units (TE) provided in the same subscriber house with a single channel thus making efficient use of the channels.

Figure 10:
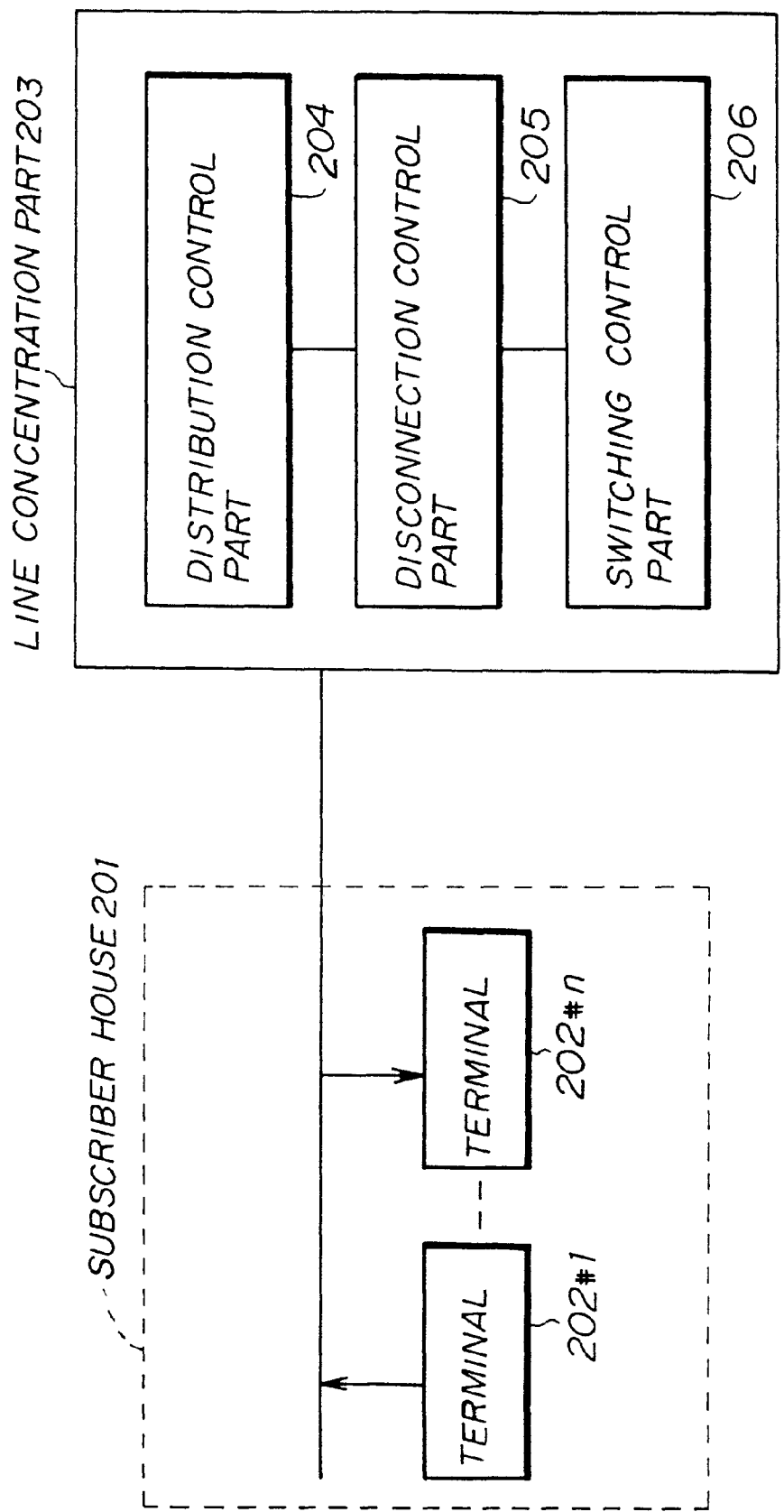
FIG. 10 is a block diagram for explaining a third embodiment of a picture distribution service system according to the present invention.

FIG. 10 is a diagram for explaining this third embodiment of the present invention. In FIG. 10, there are illustrated a subscriber house 201 which accommodates a plurality of terminals 202#1 through 202#n, and a line concentration part 203. This line concentration part 203 carries out a distribution control of a cable television program when a program distribution request, a program change request or a channel disconnection request is made from the subscriber house 201. It should be noted that this third embodiment of the present invention shown in FIG. 10 is applied to the adapters 22#1 through 22#k, the telephone units 23#1 through 23#k and the picture terminal units 24#1 through 24#k in the broadband transit switching network system shown in FIG. 2, but the present invention is not limited to the broadband transit switching network system shown in FIG. 2. This line concentration part 203 comprises a distribution control part 204, a disconnection control part 205 and a program change control part 206.

The distribution control part 204 is provided for distribution of picture information to the plurality of terminals 202#1 through 202#n. When a prescribed distribution request is made from one terminal among a plurality of terminals 202#1 through 202#n for receiving a cable television program, the distribution control part 204 assigns a channel already in use to the terminal which has made the distribution request if the cable television program is already distributed to the subscriber house 201 which accommodates that terminal. The assigned channel is one through which the cable television program is distributed to the subscriber house 201. If the cable television program is not distributed to the subscriber house 201, the distribution control part 204 assigns a new, idle channel to the terminal which has made a distribution request to the line concentration part 203, so that the terminal can receive the cable television program from the picture information source.

The disconnection control part 205 of the line concentration part 203 is provided for controlling a disconnection/release of a channel already in use from the line concentration part 203. When a prescribed disconnection request is made from one terminal among a plurality of terminals 202#1 through 202#n for disconnecting a channel through which a cable television program is being distributed, the disconnection control part 205 carries out a disconnection/release of the channel with respect to the request being made by the terminal only when no cable television program is being distributed to the remaining terminals in the subscriber house 201 which accommodates the terminal which has made the disconnection request.

The program change control part 206 of the line concentration part 203 is provided for controlling a program change of a cable television program being distributed to a terminal from a first cable television program to a second cable television program. When a prescribed program change request is made from one terminal among the plurality of terminals 202#1 through 202#n for a program change, the program change control part 206 allows the terminal to receive the second cable television program by assigning a channel already in use to the terminal if the second program is already distributed to the subscriber house 201 which accommodates the terminal which has made the program change request, the assigned channel being the same as a channel through which the second cable television program is distributed to another terminal in the subscriber house 201. If the second cable television program is not distributed to the subscriber house 201, the program change control part 206 allows the terminal which has made the program change request to receive the second cable television program by assigning a new, idle channel to such a terminal. And, the program change control part 206 carries out a disconnection/release of a channel through which the first cable television program has been distributed to that terminal, only when it is found that the first cable television program is no longer distributed to the remaining terminals of the subscriber house 201 which accommodates the terminal which has made the program change request.

In the line concentration part 203 described above, the distribution control part 204 or the program change control part 206 may be constructed so as to prohibit assignment of a new channel to the terminal which has made a program distribution request or program change request to the line concentration part 203 when there is no idle channel through which a cable television program is distributed to the terminal. And, in the line concentration part 203, the distribution control part 204 or the program change control part 206 may be constructed so as to give a notification to the terminal of a newly available idle channel for distributing a cable television program, this idle channel having not been found initially but is newly found later.

Figure 11:
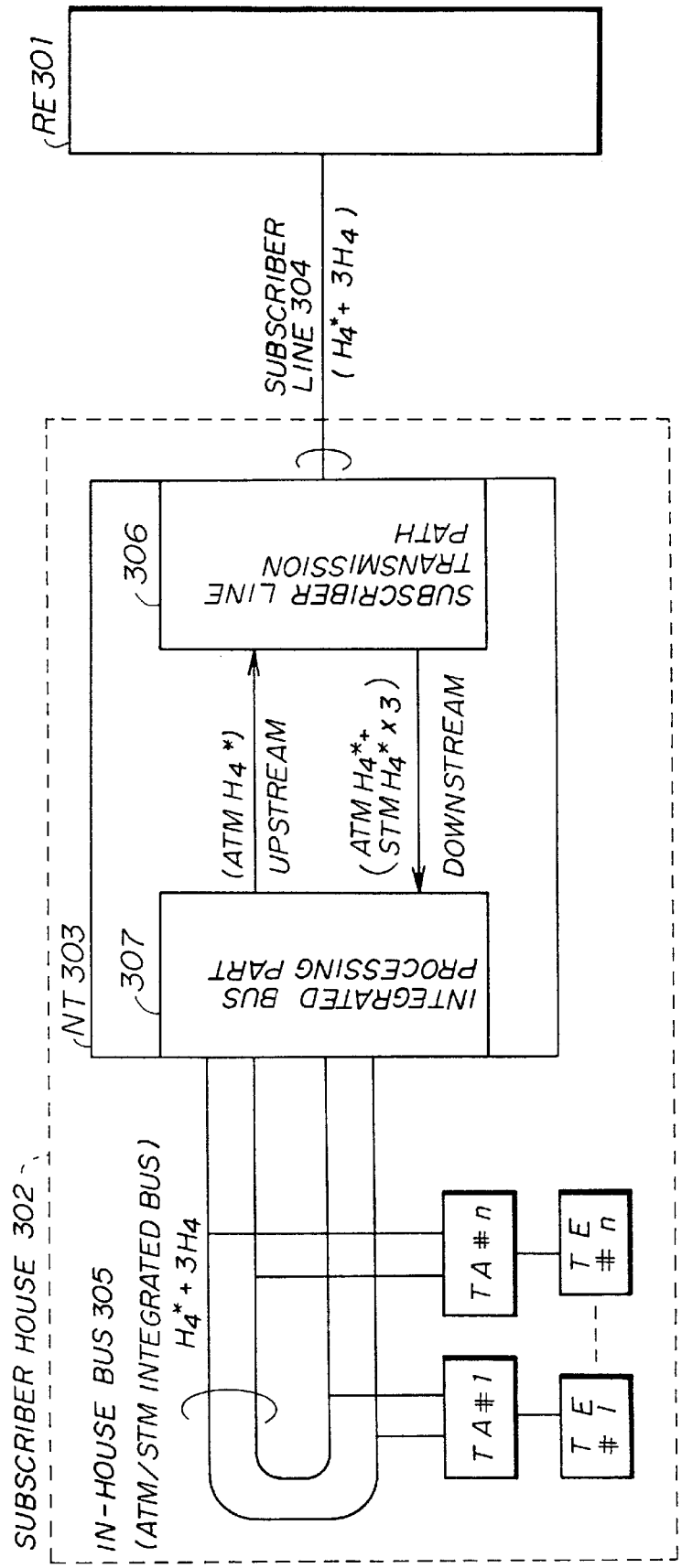
FIG. 11 is a diagram illustrating the third embodiment of the picture distribution service system.

FIG. 11 illustrates an example of a subscriber house linked to a remote equipment unit (RE) by a subscriber line, to which the third embodiment of the picture distribution service system is applied. This third embodiment of the picture distribution service system is formed in an integrated transmission network which combines a synchronous transfer mode (STM) transmission technique with an asynchronous transfer mode (ATM) transmission technique. A cable television network is constructed as part of this integrated transmission network. In FIG. 11, there are illustrated a remote equipment unit (RE) 301 and a subscriber house 302 having a network termination (NT) 303 linked to the remote equipment unit 301 by a subscriber line 304. The remote equipment unit 301 carries out a line concentration by remote control from a central switch (not shown).

In the subscriber house 302, the network termination (NT) 303 accommodates an in-house bus 305, and this in-house bus 305 is linked to a plurality of terminal adapters TA#1 through TA#n, the terminal adapters TA#1 through TA#n being connected to a plurality of terminal equipment units TE#1 through TE#n, respectively. In this case, the plurality of terminal equipment units TE#1 through TE#n are provided so as to connect one terminal equipment unit to each terminal adapter. However, two or more TE units may be connected to a signal TA unit, or the plurality of TE units may be connected directly to the in-house bus 305.

For example, there are provided in the subscriber house 303, one bidirectional channel (hereinafter, simply called a H4* channel) for ATM transmission at a transmission rate of 135.632 Mb/s and three one-directional channels (hereinafter, simply called a H4 channel) for STM transmission to distribute a cable television signal at a transmission rate of 132 Mb/s for downstream transmission only. The plurality of terminal equipment units TE#1 through TE#n can freely communicate with a terminal equipment unit TE provided within another subscriber house (not shown) by means of the H4* channel described above. And, by means of the three H4 channels described above, the terminal equipment units TE#1 through TE#n can receive the cable television service from the picture information source which is related to the present invention.

Next, the function or operation of the third embodiment which is carried out by the RE 301 and the TE#1 through TE#n shown in FIG. 11 will be described, with reference to FIGS. 12 through 14.

Figure 12:
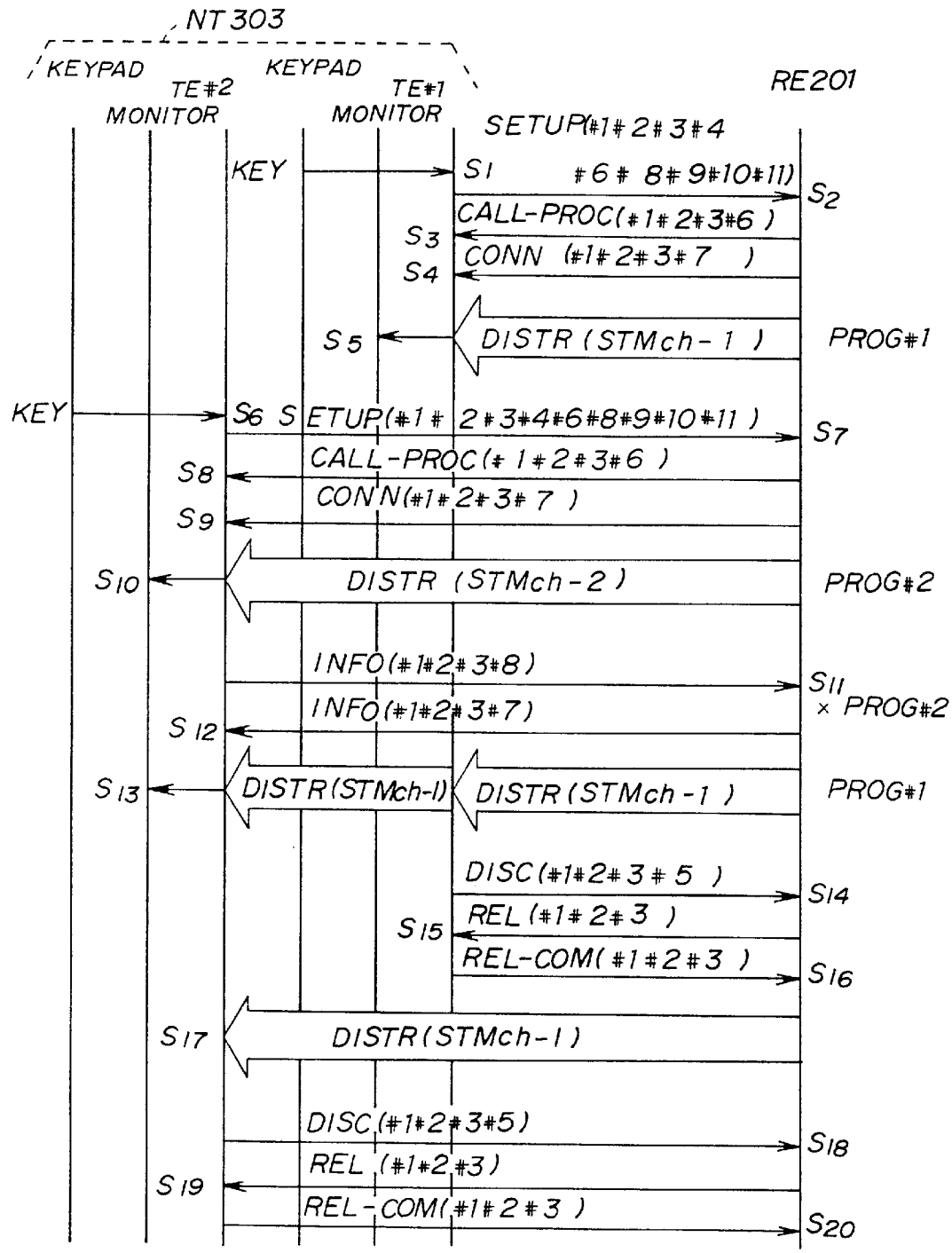
FIG. 12 is a sequence chart for explaining the operation of the third embodiment when a program change request is made.

FIG. 12 is a sequence chart for explaining the operation of the third embodiment when a program change request is made by a terminal equipment unit TE to a remote equipment unit RE, a cable television source program being distributed to the terminal equipment TE through a channel. In a case shown in FIG. 12, the TE#1 and TE#2, for example, make a distribution request first, and later a program switching request is made by the TE#2 to the RE 301. First of all, a step S1 inputs a source program number "PROG#1" from a keyboard of the TE#1 for a user to make a program distribution request. In a step S2, the TE#1 notifies the TE#1 by a Layer 3 Setup message that a cable television program PROG#1 and a STM channel are being used. This setup message includes several data as indicated by #1 to #4, #6, #8 to #11 in FIG. 12. #1 is a protocol identifier which denotes the Layer 3 message of the D-channel protocol. #2 is a call number which is a call number established by the TE#1 in this case. #3 is a message type which indicates a SETUP message in this case. #4 is a transmission capacity which indicates that a STM channel is used. #6 is a channel identifier. #8 is a keypad facility which denotes the source program number "PROG#1" inputted from the keyboard as described above. #9 is a receive number which is indicated by TE#1 in this case. #10 and #11 are a lower layer matching and an upper layer matching, respectively, and a description thereof is omitted.

After the SETUP message is received by the RE 301, in a step S3, the RE 301 notifies the TE#1 by a CALL-PROC message stating that a call control procedure is under way. This CALL-PROC message includes the several data #1 to #3 and #6 as described above, and the TE#1 is notified with the data #6 of the channel number (for example, "STMch-1") of a STM channel which is currently usable for the source program distribution. In a step S4, the TE#1 is notified by the RE 301 by a CONN message stating that the TE#1 is successfully connected. This CONN message includes the data #1 to #3 and #7, and the data #7 in this case is an indication which represents a cable television broadcast.

After these steps S1 through S4 are carried out, the terminal equipment TE#1 can receive a broadcast service of the source program with the program number "PROG#1" from the picture information source through the STM channel with the channel number "STMch-1". A step S5 indicates that the source program "PROG#1" is distributed to the TE#1 through the STM channel "STMch-1".

Similar to the steps S1 through S5 described above, steps S6 through S10 are carried out by the TE#2 and the RE 301. For example, a source program number "PROG#2" is inputted from a keyboard of the TE#2 and then the TE#2 can receive a broadcast service of the source program number "PROG#2" through the STM channel "STMch-2".

When the user at the terminal equipment TE32 desires to change the currently supplied source program from the program number PROG#2 to the program number PROG#1, in a step S11, a keystroke data indicating a program switching request being made as well as a new program number to which the current source program number is changed is inputted. The keystroke data and the new program number are inputted from the keyboard of the TE#2 by the user. The TE#2 notifies the RE 301 by an INFO message including these data, and this INFO message contains the data #1 to #3 and #8 as indicated in FIG. 12. By executing a normal call control program, the RE 301 discriminates that the source program with program number "PROG#1 has already been distributed to the TE#1. In a step S12, the RE 301 transmits to the TE#2 an INFO message including the channel number "STMch-1" which is the same as that of the STM channel currently used by the TE#1. This INFO message contains the data #1 to #3 and #7 as indicated in FIG. 12.

The above allows the TE#2, together with the TE#1, to receive the broadcast service of the source program with the program number PROG#1 through the STM channel with the channel number STMch-1. A step S13 indicates that the source program PROG#1 is distributed to both the TE#1 and the TE#2 through the STM channel STMch-1.

When a disconnection request of a channel is made from a terminal equipment unit among those which receive the same source program, the channel is disconnected and released only when the final TE among those TE receiving the source program makes a disconnection request. For example, in the case shown in FIG. 12, in a step S14, the TE#1 transmits to the RE 301 a DISC message indicating a call release request. This DISC message includes the data #1 to #3 and #5 as indicated in FIG. 13. The data #5 is a reason indication which indicates in this case a normal disconnection of the channel concerned. In a step S15, the RE 301 transmits a REL message to the TE#1, this REL message indicating a completion of channel disconnection and a request for releasing the channel used with the call number. After the REL message is received, in a step S16, the TE#1 sends to the RE 301 a REL-COM message indicating a release of the channel and a completion of channel release. Both the REL message and the REL-COM message include the data #1 to #3. In this connection, the RE 301 checks that the STM channel with channel number "STMch-1" is still used by the TE#2, does not perform a release of the channel and continues to distribute the source program to the TE#2. As in the foregoing, the procedure is repeated until the final TE is processed, even when two or more TE units are using the same STM channel.

Then, in a step S18, the TE#2 (the final TE using the channel STMch-1) sends a DISC message to the RE 301, so that the RE 301 carries out a releasing of the channel. In a step S19, the RE 301 sends a REL message to the TE#2, and, in a step S20, the TE#2 sends a REL-COM message back to the RE 301.

Figure 13:
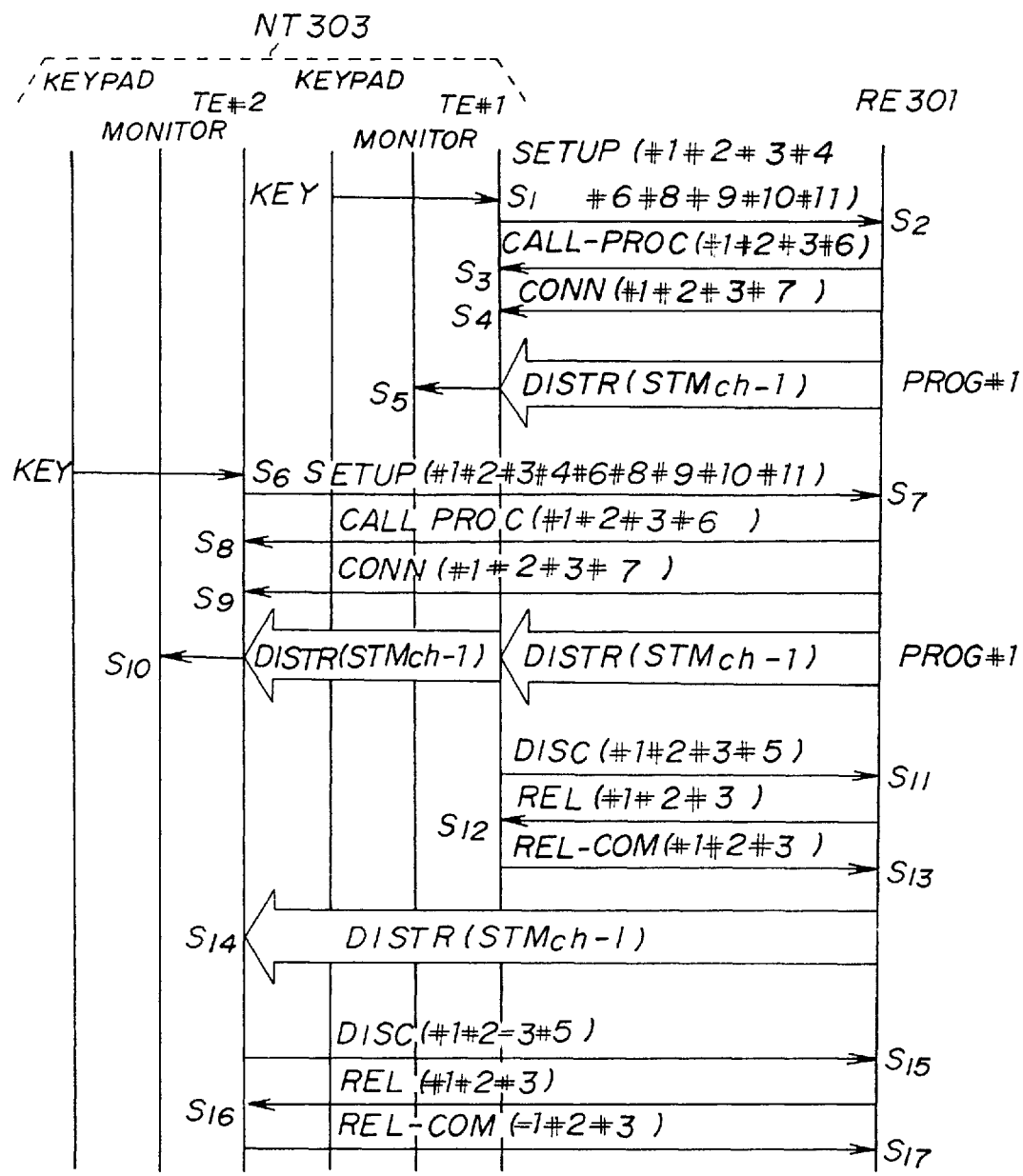
FIG. 13 is a sequence chart for explaining the operation of the third embodiment when a channel disconnection request is made.

FIG. 13 is a sequence chart for explaining the operation of the third embodiment when the same source program number is initially requested by and distributed to two or more terminal equipment units TE, and a separate disconnection request is made later by these terminal equipment units. In FIG. 13, there is shown an example of such an operation in which a source program with program number PROG#1 is distributed to the TE#1 and the TE#2. As shown in FIG. 13, after steps S1 through S5, similar to the steps Si through S5 shown in FIG. 12, are carried out by the TE#1 with the RE 301, a broadcast service of the source program number "PROG#1" from the picture information source is distributed to the TE#1 through the STM channel with channel number "STMch-1".

Similar to the steps S1 through S5 shown in FIG. 13, steps S6 through S10 are carried out by the TE#2 and the RE 301. The source program number "PROG#1", which is the same as the program number of the source program already received by the TE#1, is inputted from the keyboard of the TE#2, and then the TE#1 and TE#2 can receive a broadcast service of the same source program number "PROG#1" through the same STM channel "STMch-1".

More specifically, in a step S6, the source program number "PROG#1" is inputted from the keyboard of the TE#2. In a step S7, the TE#2 notifies the RE 301 of the program number (PROG#1) to be received and the STM channel to be used. This notification is made by a SETUP message sent to the RE 301. By executing the call control program, the RE 301 checks that the source program with program number PROG#1 is already distributed to the TE#1. In a step S8, the RE 301 transmits a CALL-PROC message to the TE#2, informing the TE#2 that the source program number PROG#1 is the same as the source program number already received by the TE#1. And, in a step S9, the RE 301 transmits a CONN message to the TE#2, informing the TE#2 that a connection has been made to the TE#2. When the steps S1 through S9 above are carried out, the TE#2, together with the TE#1, can receive a broadcast service of the same source program with program number PROG#1 through the same STM channel with channel number STMch-1. This is indicated by a step S10 shown in FIG. 13.

Steps S11 through S17 shown in FIG. 13 are carried out in a similar manner to the steps S14 through S20 shown in FIG. 12. In the steps S11 through S13 in FIG. 13, the TE#1 first makes a disconnection request to the RE 301, and the TE#1 is then disconnected and released from the STM channel, but a connection of the TE#2 to the STM channel remains unchanged because the TE#2 still receives the source program PROG#1 through the channel STMch-1. In the steps S18 through S20, the TE#2 makes a disconnection request to the RE 301, and then the TE#2 which has made a final disconnection request is disconnected and released from the STM channel.

Figure 14:
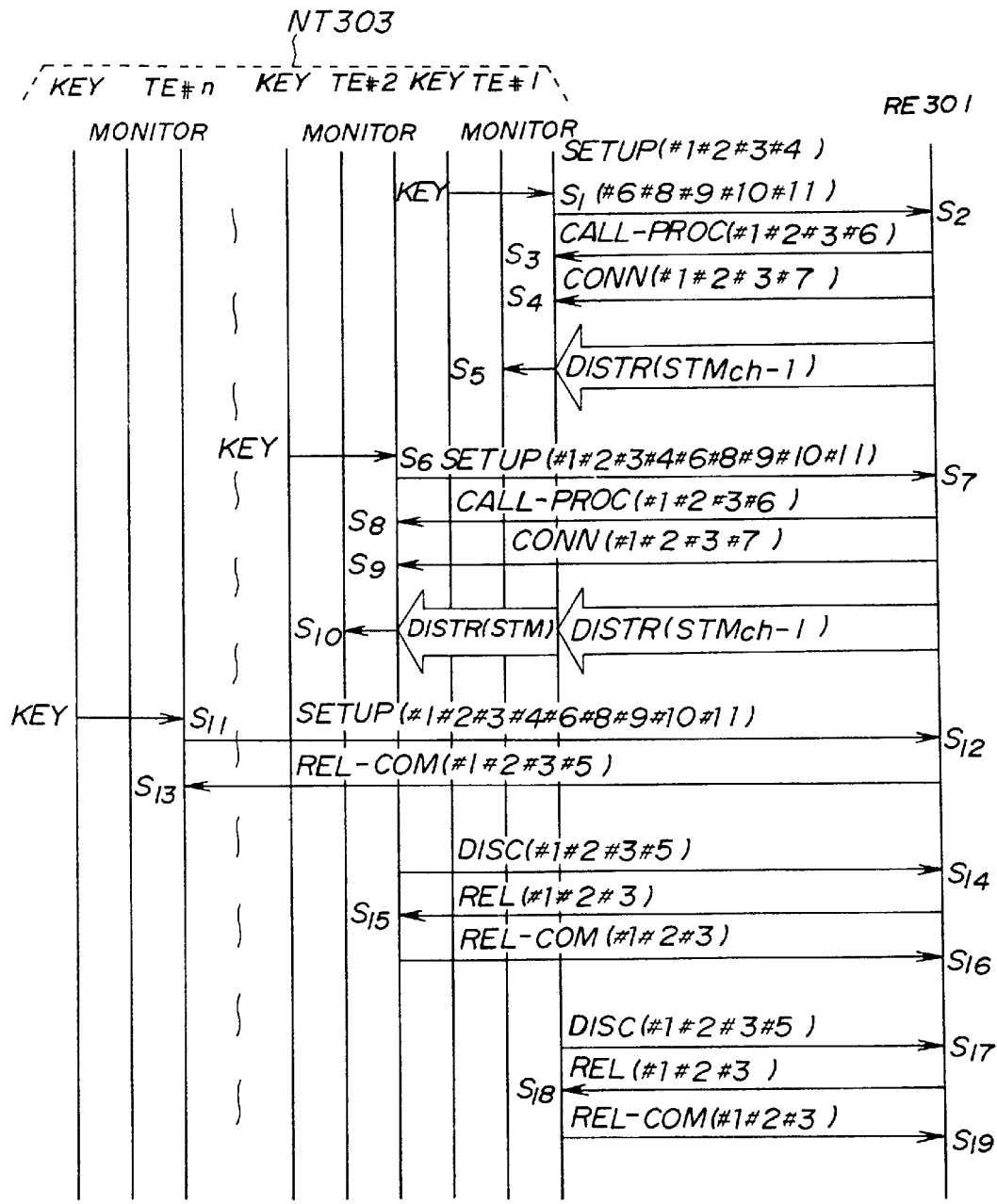
FIG. 14 is a sequence chart for explaining the operation of the third embodiment when no idle channel is available to a terminal equipment unit upon a request for distribution.

Finally, FIG. 14 is a sequence chart for explaining the operation of the third embodiment of the present invention when a distribution request is made from a terminal equipment unit but no idle channel is available because all the channels are being used by other terminal equipment units. Steps S1 through S10 shown in FIG. 14, which are similar to the steps S1 through S10 shown in FIG. 13, are carried out by the TE#1 and TE#2 with the RE 301, and the TE#1 and the TE#2 can receive a broadcast service of the source program with program number PROG#1 through the STM channel with channel number STMch-1. And, it is assumed in FIG. 14 that the several distribution requests are made by other terminal equipment units TE and in a manner similar to the above described one the broadcast service of several source programs are distributed to these terminal equipment units through the STM channels with channel numbers STMch-1 and STMch-2, so that all three STM H4 channels in the subscriber house 302 are being used for program distribution service. The above procedure is not shown in FIG. 14.

In the condition described above, in a step S11, another terminal equipment unit TE#n inputs a different source program number from a terminal of the TE#n to the RE 301. A step S12 transmits a SETUP message from the TE#n to the RE 301, informing the RE 301 of the source program number to be received and the STM channel to be used. By executing a call control program, the RE 301 checks that there is no idle STM channel in the network termination unit. In a step S13, the RE 301 transmits a REL-COM message to the TE#n, informing the TE#n that a connection of the TE#n to the channel cannot be made. In this case, the data #5 of reason indication which is included in the REL-COM message indicates that no channel is available.

After the step S13 above is performed, it is assumed in FIG. 14 that the TE#2 and the TE#1 are disconnected and released from the STM channel STMch-1 as in the steps S14 through S16 and in the steps S17 through S19, respectively, and the STM channel STMch-1 becomes idle. In such a condition, an INFO message is sent from the RE 301 to the TE#n, informing the TE#n that an idel channel is now available, and, if the TE#n again makes a distribution request, then the STM channel STMch-1 can be assigned to the TE#n to receive the broadcast service from the picture information source, according to the present invention. This function of the picture distribution service system can be easily achieved with the RE 301 in which a previous operation record concerning the operation which has been carried out by the RE 301 for a given time period is stored in a certain memory and the previous operation record stored in the memory is accessible. According to the third embodiment described above, it is possible to assign the same cable television program to a single channel when that program is distributed in common to a plurality of terminal equipment units accommodated in the same subscriber house, thereby enabling efficient program distribution to a plurality of terminal equipment units, the number of which is greater than the maximum number of channels available for cable television distribution. Thus, by using a limited number of the channels accommodated in the same subscriber house, the efficiency of the picture distribution service system can be increased remarkably.

The present invention is not limited to the above described embodiments, and variations and modifications may be made without departing from the scope of the present invention.

What is claimed is:

1. A picture distribution service system which distributes a cable television service from a source to a plurality of subscriber terminals in a broadband transit network and supplies a picture processing service to the plurality of subscriber terminals for processing picture information from said source, comprising:

a transit switch which connects the plurality of subscriber terminals to a transit line for transmitting said picture information from said source;

a distribution switch which distributes the picture information from the source to the plurality of subscriber terminals, said distribution switch being provided for the transit switch for carrying out a transit line connection and a picture signal conversion; and a plurality of function means which are provided in common for said subscriber terminals and link the transit switch to the distribution switch for carrying out a predetermined picture processing function for recording, replaying and viewing of picture information supplied from said source, each said function means having a selective switch part, a picture memory part and a control part, at least one of said function means being connected to at least one of said subscriber terminals when a first connection, which is an indirect connection, is selected by said selective switch part, said selective switch part of each said function means being operated by said control part in accordance with a control from a call control part connected to said picture distribution service system when a call control signal is transmitted from one of the subscriber terminals to said call control part, said selective switch part selectively connecting said one of said subscriber terminals to the at least one of the function means by the first connection or said one of said subscriber terminals to said source by a second connection which is a direct connection.

2. The system as claimed in claim 1, wherein said picture distribution service system distributes a cable television service from the source to the subscriber terminal in the broadband transit network when the second connection of said selective switch part is made, and when the first connection of said selective switch part is made said picture distribution service system supplied a picture processing service to the subscriber terminal for processing picture information from the source.

3. The system as claimed in claim 1, wherein supplied picture information from said source is stored in said picture memory part when the first connection of said selective switch part is made, which allows a subscriber at the subscriber terminal to change a service mode of the picture processing service supplied from said source to the subscriber terminal.

4. The system as claimed in claim 1, wherein the service mode of the picture processing service from the source is changed, when the first connection of said selective switch part is made, in accordance with a call control signal supplied from the subscriber terminal to the call control part, said call control signal carrying a service mode change data.

5. A picture distribution service system which carries out a distribution control of a cable television service from a remote equipment to a subscriber house in response to a request made from the subscriber house to the remote equipment, the remote equipment being connected to a source station via a broadband transit network, comprising:

a network termination, provided within the subscriber house, which is connected to the remote equipment via a subscriber line;

a plurality of subscriber terminals provided within the subscriber house and connected to an integrated bus of the network termination, each of which transmits a request for distribution of a cable television service program, a request for disconnection from the remote equipment, or a request for switching of the cable television service program, to the remote equipment via the subscriber line;

concentration means, provided within the remote equipment and connected to the network termination via the subscriber line, which carries out a line concentration through a remote control signal supplied from the source station via the broadband transit network; and distribution control means, provided within the remote equipment, which distributes a cable television service program to one of the subscriber terminals by using a channel in response to the request for distribution of said cable television service program supplied from one of the subscriber terminals to the remote equipment;

wherein, when said cable television service program is already distributed to another subscriber terminal of the subscriber house by using another channel, said distribution control means distributes said cable television service program to said one of the subscriber terminals by using said another channel, and, when said cable television service program is not distributed to any of the subscriber terminals of the subscriber house, said distribution control means distributes said cable television service program to said one of the subscriber terminals by using a new channel.

6. The system as claimed in claim 5, wherein said distribution control means sends a message to a terminal when an idle channel is newly available, said message notifying said terminal that said idle channel is newly available and it is possible to accept a new program distribution request, a previous program distribution request made by said terminal having been rejected due to a previous state of said subscriber house in which all the channels accommodated in said subscriber house are busy and no idle channel is available.

7. The system as claimed in claim 5, wherein said program switching control means sends a message to a terminal when an idle channel is newly available, said message notifying said terminal that said idle channel is newly available and it is possible to accept a new program switching request, a previous program switching request made by said terminal having been rejected due to a previous state of said subscriber house in which all the channels accommodated in said subscriber house are busy and no idle channel is available.

8. The system as claimed in claim 5, further comprising disconnection control means for carrying out a disconnection and release of a channel through which a specific cable television program is distributed only when a request for channel disconnection concerning said cable television program is made from a terminal among the plurality of terminals and it is found that said cable television program is not distributed through said channel to another terminal in the subscriber house which accommodates said terminal which has made said request.

9. The system as claimed in claim 8, wherein said disconnection control means prohibits a program distribution to a terminal by means of a new channel when said terminal makes a program distribution request and no idle channel accommodated in said subscriber house is found.

10. The system as claimed in claim 8, further comprising program switching control means for carrying out a program switching from a first program to a second program, said program switching control means carrying out a distribution of said second program through a channel already in use to a terminal among the plurality of terminals when a request for said program switching is made from said terminal and it is checked that said second program is already distributed through said channel to other terminals in the subscriber house accommodating said terminal which has made said request, said program switching control means carrying out a distribution of said second program through a new idle channel to a terminal among the plurality of terminals when a request for said program switching is made from said terminal and it is checked that the second program is not distributed to other terminals in said subscriber house, and said program switching control means carrying out a disconnection and release of a channel through which said first program is distributed to a terminal among the plurality of terminals only when a request for said program switching is made from said terminal and it is checked that said first program is not distributed through said channel to other terminals in said subscriber house accommodating said terminal which has made said request.

11. The system as claimed in claim 10, wherein said program switching control means prohibits a program switching of a terminal from a first program to a second program by assigning a new channel to said terminal when said terminal makes a program switching request and no idle channel accommodated in said subscriber house is found.

12. A picture distribution service system which distributes picture information service from a source to a plurality of subscriber terminals in a network, said system comprising:

a transit switch which switches transit lines and receives requests from first requesting subscribers connected to said transit switch, to cause picture information to be distributed to said first requesting subscribers;

first trunk means, connected to said transit switch, for distributing picture information from a center switch to the transit lines to which said first requesting subscribers are connected;

a subscriber switch which switches subscriber lines and receives requests from second requesting subscribers connected to said subscriber switch, to cause picture information to be distributed to said second requesting subscribers; and second trunk means, connected to one of the transit lines, for distributing the picture information received via said one of the transit lines to the subscriber lines to which said second requesting subscribers are connected.

13. The system as recited in claim 12, wherein at least one gate switch is included, said at least one gate switch being connected to one of said first trunk means and said second trunk means, said at least one gate switch selectively distributing the picture information to the subscriber terminals through said first and second trunk means.

14. The system as claimed in claim 12, wherein said first trunk means further comprises a main terminal and a number of subterminals which are arranged to connect the center switch to the transit switches through said one of the transit lines.

15. The system as claimed in claim 12, wherein said second trunk means further comprises a main terminal and a number of subterminals which are arranged to connect said each transit switch to the subscriber switches through said one of the subscriber lines.

16. A picture distribution service system which distributes a cable television picture service from a source to a plurality of subscriber terminals in a broadband transit network, said system comprising:

a transit switch which switches transit lines;

a first trunk means for distributing picture information from a center switch to the transit lines;

a subscriber switch which switches subscriber lines; and second trunk means, connected to one of the transit lines, for distributing the picture information received via said one of the transit lines to the subscriber lines, wherein said first and second trunk means each comprise a memory part having a plurality of storage areas which are each used to store supplied picture information, so that the subscriber switch carries out a switching of the subscriber lines and the transit switch carries out a switching of the transit lines to distribute picture information, which is read out from each of the storage areas of said memory part, to the subscriber terminals which have made a call to the source.

* * * * *